United States Patent Office 3,354,985
Patented Nov. 28, 1967

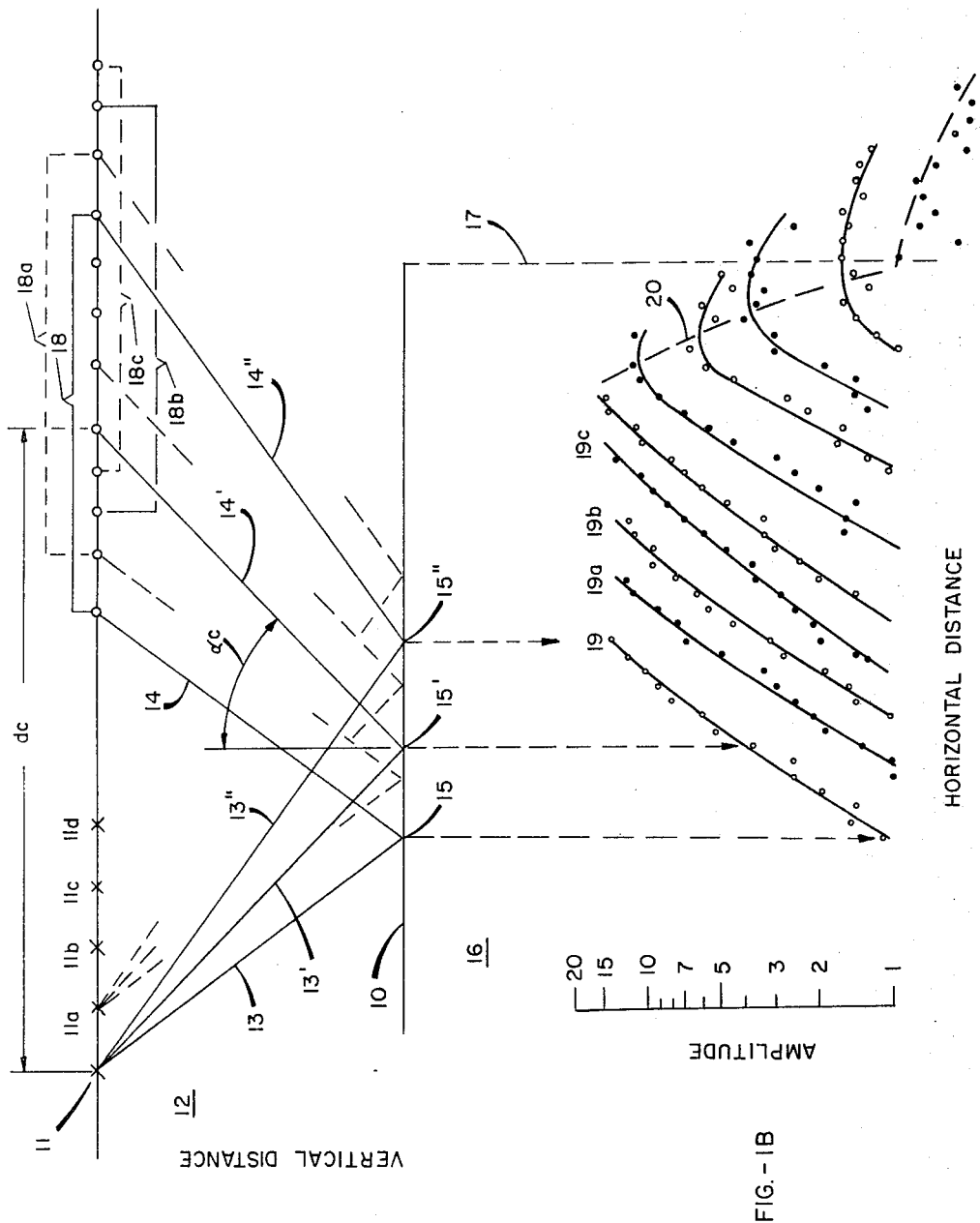

3,354,985
SEISMIC PROSPECTING METHOD OF LOCATING A SUSPECTED FAULT
Neil R. Sparks, Tulsa, Okla., assignor to Pan American Petroleum Corporation, Tulsa, Okla., a corporation of Delaware
Filed Sept. 22, 1966, Ser. No. 584,629
8 Claims. (Cl. 181—.5)

ABSTRACT OF THE DISCLOSURE

This invention concerns a method of seismic prospecting for determining the exact location of a suspected underground fault in a particular subsurface formation. It includes a fixed array comprising a source of seismic energy and a horizontal spread of seismic detectors in alignment with a shot point and a suspected fault location. The array is placed in one location, the seismic energy source is activated and a plot is made of the maximum reflection amplitude for the particular subsurface formation for each detector position. These maxima are connected to form an amplitude curve. The fixed array is moved in the direction of the suspected fault and additional amplitude curves are obtained for various positions of the fixed array. When the maximum amplitudes of successive amplitude curves decrease, a line is drawn through the maxima of these curves which indicates the location of the subsurface fault.

---

This is a continuation-in-part of patent application 339,465, "Seismic Prospecting Method," filed Jan. 22, 1964, now abandoned, Neil R. Sparks, applicant.

This invention relates to locating the termination of a subsurface bed by acoustical or other wave-form signals. More specifically, this invention is concerned with a method of seismic prospecting for locating a buried fault, such as a fault occurring in a subsurface, relatively high velocity formation.

In seismic prospecting, artificially produced seismic waves are initiated in the earth by explosive, mechanical, hydraulic or other means at a location generally designated as a shot point. The seismic waves produced by such seismic disturbance are transmitted through the earth and may be detected at a plurality of spaced points to determine the depth and shape of subsurface formations which oftentimes are indicative of the presence of subsurface deposits, such as petroleum or the like. In the reflection method of seismic surveying, the seismic waves are passed through the earth, with a portion of the wave energy being reflected from the interfaces of subsurface formations and received by spaced-apart seismic detectors, or seismometers, each providing an electrical output signal which is appropriately amplified, filtered, etc., and recorded on a seismic trace. The travel times of the reflected seismic wave signals are used to locate the surface from which the reflections originate. In the refraction method of seismic surveying, seismic wave signals which are created at the shot point, transmitted through the earth and travel along a subsurface bed are employed to obtain information as to the depth and shape of subsurface formations. In both of the above methods the travel times and distances between the shot point and the seismometers are utilized to calculate the depths and dips of refracting boundaries, or reflecting horizons. Generally speaking, in the reflection method the range of the seismometer spread from the shot point is relatively short, while in the case of the refraction method, shot point-seismometer spread range is relatively long. The difference in the ranges used in each of the above methods is due primarily to the differences in times required for the seismic signals to travel through the earth by each method.

Uncertainties arise in mapping the location of a buried fault with conventional reflection or refraction seismic methods because of the fact that the recorded event does not disappear as the fault is crossed, but continues beyond the fault as a diffraction. The diffraction merges in time with, and has about the same character as the reflection (or refraction) from the subsurface bed. Thus, the moveout of the event in crossing the fault can easily be misinterpreted as only a change in the dip of the bed.

Therefore, a general object of the present invention is an improved seismic prospecting method for locating subsurface faults. Other objects and particular advantages will become apparent from the following description of the invention.

For any given index of refraction there occurs a case where the angle of refraction is 90°, that is, the refracted beam essentially travels along the interface between two media. As used herein, the angle of the reflected ray which results in a refracted angle equal to 90° is referred to as the "critical angle of reflection," and the distance from the shot point to the seismic detector receiving the reflected seismic signals at the critical angle of reflection is referred to herein as the "critical distance." Thus, any stratification of media has a characteristic critical angle of reflection and critical distance which may be determined by well-known methods. If a seismometer is located within the critical distance of the shot point, the seismometer will pick up reflected seismic wave signals. On the other hand, if a seismometer is located outside of the critical distance, the seismic wave signals received by the seismometer is a superposition of reflected and refracted waves.

The present invention employs the measurement of the amplitudes of seismic wave signals to indicate the location of a subsurface fault. It has been found that the reflection amplitude of a seismic signal increases significantly as the angle of reflection of the seismic wave signal approaches the critical angle of reflection. Thus, if an array is established comprising a source of seismic waves at a shot point location and a spread of spaced-apart seismic detectors laid out so that the spread encompasses the critical distance, it will be observed that the amplitude of the reflected signal increases with increasing spread distance when the array is far removed from a subsurface fault. However, as the fixed array is moved as a unit toward the fault, the amplitude of the reflected signal begins to decrease at the longest spread distances as the fault is approached, and this decrease continues as the relocation of the fixed array is continued and the point of reflection crosses the fault. If for each location a plot is made of reflection amplitude versus detector position, there results a point of maximum amplitude for each amplitude curve, and a line through the maxima of these curves indicates the location of the subsurface fault.

According to the invention, a fault in a subsurface formation may be located by establishing a fixed array comprising a source of seismic energy at a shot point location and a horizontal spread of seismic detectors in alignment with the shot point and a suspected fault location so that the detector spread encompasses the critical distance for the subsurface formation and the overlying material. A seismic wave is initiated in the earth at the shot point and the resulting seismic wave signals arriving at the locations of the detectors in the array are received and a set of detector signals produced as a function of the received signals, with the detector signals being recorded on a seismic trace. Subsequently, the fixed array is relocated closer to the suspected fault location along a line between the shot point and the suspected fault location. Another seismic wave is initiated in the earth at the relocated shot point and the resulting seismic wave signals detected and a second set of detector signals produced and recorded. The relocating of the fixed array, together with the associated seismic wave initiation, detecting and recording steps are repeated while moving along the line toward the suspected fault location to provide sufficient data points to accurately delineate the buried fault. Typically, the relocating is continued until at least a significant number of the reflection points of the seismic wave signals reflected from the interface of the formation of interest and the overlying material, and preferably until the reflection point for the detector nearest the shot point, passes the suspected fault location. The recorded sets of detector signals preferably are plotted in the form of an amplitude curve wherein the amplitudes of each of the signals received by the detectors at the various locations are plotted versus detector position for each array location. The points of maximum amplitude for the detected signals represented by each of said sets may then be employed to indicate the true location of the subsurface fault. Typically, a line is drawn through these amplitude maxima to approach the fault and indicate its location. In a preferred embodiment of the invention, the present method is employed to locate a fault in a subsurface formation having a seismic wave transmission velocity greater than that of the overlying material by running a velocity log of the formation and the overlying material and then laying out the fixed array so that the critical distance is in the approximate center of the detector spread, followed by shooting and relocating the spread as a unit until the point of reflection passes the suspected fault location.

The present invention will be better understood by reference to the following description of the invention and the accompanying drawings wherein:

FIGURE 1-A diagrammatically illustrates a typical array of a seismic energy source and seismic detector spread as used in the practice of the invention; and FIGURE 1-B is a plot of a group of amplitude curves from records made as the array is moved toward a fault location.

As shown in FIGURE 1-A, a seismic wave initiated at shot point 11 will travel downwardly along lines 13, 13', 13'', etc., through formation 12 and be reflected upwardly along lines 14, 14', 14'', etc., from the interface 10 between formation 12 and formation 16 which terminated at one end by fault 17. The reflected seismic wave signals are received by the seismometers in a horizontal seismometer spread 18 which is planted along a line from shot point 11 toward fault 17. Typically, formation 16 has a relatively high seismic wave transmission velocity in comparison to the overlying material. It is to be understood that, for the purpose of illustration, formation 12 is shown as a single layer of material overlying formation 16, and that in actual practice a large number of layers of different materials may lie on top of the formation of interest. Likewise, only three detectors are shown in each spread, although, typically, about 12 or more detectors may be used in each spread, according to well-known practices.

From a knowledge of the seismic wave transmission velocities of formation 16 and overlying material 12, the critical angle of reflection $\alpha_c$ may be calculated by known procedures, and the critical distance $d_c$ determined from a knowledge of the depth of the reflecting interface 10. Typically, a velocity survey of the formations involved may be obtained using an existing well in the vicinity of the area being surveyed, and from this, the necessary information is obtained to determine the approximate critical distance.

The seismic energy source employed at shot point 11 may be any suitable source of seismic waves, such as an explosive charge, a vibrator or other mechanical, hydraulic, electromagnetic, or other device capable of initiating suitable seismic waves for transmission through the earth. The shot point may be located at or near the surface of the earth, or it may be located at a suitable depth from the surface, and typically is located beneath the weathered layer. The seismic detectors employed in the detector spread may be any suitable type of seismometer. Typically, a horizontal spread of a suitable number of seismometers is placed at or near the earth's surface along a substantially straight line between the first shot point location and the suspected fault location. The seismic energy source and the detector spread form a fixed array, which may be relocated as herein described, but wherein the spacial relationship between the seismic energy source and the various detectors in the spread is maintained constant.

In making the initial setup, it is preferred to locate the center of the detector spread at approximately the critical distance from the first shot point, so that a portion of the detectors in the spread are on the near side of the critical distance and another portion on the far side thereof. The seismic detectors employed in the spread are connected to suitable equipment for appropriately amplifying the signal outputs from the detectors and for recording the outputs on seismic traces. The seismometers are suitably spaced to give sufficient data points to establish an amplitude curve (as hereinafter described) for each shot, with the spacing typically ranging from about 100 to about 250 feet, depending upon the depth of the formation of interest. The equipment employed in the practice of the invention may be conventional seismic surveying equipment except that an expander may be employed to control the amplifier gain or, if desired, fixed-gain control may be employed. In the positioning of the detectors, the closest detector of the spread is on the near side of the critical distance, as mentioned above, with the most remote detector being at a distance beyond the critical distance, but not at such a distance as to result in an observable significant time difference between the arrival of the reflected and refracted seismic wave signals at the remote detector location. After making the initial setup, initiating the seismic wave signals at shot point 11 and obtaining the record of the signals arriving at the detectors, the source-detector array is moved as a unit toward the suspected fault location. For example, the shot point is moved to points 11a, 11b, 11c, etc., the detector spread to locations 18a, 18b, 18c, etc., and correspondingly, the associated reflection points 15, 15', 15'', etc., move toward the fault. For the purpose of clarity, only one set of seismic wave signals are shown, represented by solid lines; however, it is to be understood that for each shot point a similar set of signals will be transmitted to the detectors in that array. As mentioned above, the spacial relationship between the detectors and the source is maintained substantially constant upon relocation and for each array location the critical distance remains substantially the same, assuming that the relationship between the formation of interest and the overlying material remains substantially the same. In relocating the fixed array, various techniques may be employed to move the array as a unit, but it is generally preferred to use the "roll-along" method of moving the detectors in the spread. In this method the closest detector or detectors on the near side of the spread are relocated on the far side, with a number of the detectors in the spread remaining planted in the same location. Such use of overlapping seismometer spreads permits the use of normalizing procedures to minimize amplitude differences due to variations in seismic wave source energy and depth, seismometer sensitivity and the like.

As shown in FIGURE 1-B, the amplitude of the recorded event at each seismic detector may be plotted against the corresponding detector position for each location of the fixed source-detector array. Conveniently, the amplitudes may be plotted on a diagram, as shown, directly below the corresponding reflecting point, halfway between the source and the detector on which the amplitude is measured. In this manner each set of detector signals for a given array location represents the range of amplitudes recorded on the seismometer spread from the energy source at the shot point. Then, succeeding amplitude curves 19, 19a, 19b, 19c, etc., for progressive positions of the fixed array indicate the changing amplitudes which result from moving the array toward the suspected fault location, i.e., the movement of the reflecting points toward the fault. As shown in FIGURE 1–B, the amplitude scale is in longarithmic units. From such a spot, the direct correspondence between the measured amplitudes and the reflecting point positions demonstrates the manner in which the amplitudes are affected by the presence of a subsurface fault. When the array of source and detector spread is to the left (as shown on the plot) and the reflecting points far removed from the fault, the amplitude for each shot rises by a significant factor, typically in the range of about 4:1 to 10:1, depending upon variations in the material being investigated. As the fixed array, and consequently the reflection points, approaches the fault, the amplitude curves begin to turn over as shown and then flatten out and decrease as the reflection points cross the fault location, resulting in a point of maximum amplitude for each set of detector signals. A line 20 drawn through these amplitude maxima indicates the true location of the fault. The plotting can be done either by hand using simple drafting instruments, or by automatic machine plotting used in conjunction with digital computers. A discussion of such automatic plotting, for example, is found in Bulletin No. 175B/February 1966, California Computer Products, Inc., 305 No. Muller Street, Anaheim, Calif. Analyzers for determining the maximum amplitude are commercially available, for example, from Micro Instrument Company, 13100 Crenshaw Boulevard, Gardena, Calif., and are designated Memory Voltmeter Series 5200.

The progressive relocation of the shot point-detector spread array is continued until sufficient amplitude maxima are established to enable the fault to be located. Generally, the progressive relocation of this array will be continued until a significant number of the reflection points have crossed the suspected fault location, and typically, until the reflection point for the detector nearest the shot point has crossed the suspected fault location.

The above increase in amplitude for the output of the detectors on the near side of the spread is due to the increase in reflection coefficient at the reflecting interface as the angle of incidence approaches the critical angle. The increase in amplitudes for the output of the detectors on the far side of the spread is due to the almost simultaneous superposition of a reflection and a refraction from the reflecting interface beyond the angle of critical reflection. The decrease in maximum amplitude of the curves as the fault is approached, and ultimately crossed, is due to the reflection and the refraction being scattered from the fault as diffractions. The change to diffraction begins to be evident before the reflecting point reaches the fault. The rising characteristic of the amplitude curves in the absence of a fault, combined with the drooping characteristic where diffractions from the fault are present, is a principal diagnostic feature of the present method of mapping the location of a fault. Also, the magnitude of the change in amplitude plays an important role, since the amplitude change should be large enough to provide reliable results and override typical amplitude variations due to seismometer plant and the like.

In order to illustrate the present invention, a two-dimensional model was constructed to represent, in cross section, a faulted limestone bed surrounded by an overlying shale formation. The limestone bed was represented by a sheet of relatively high velocity steel, 0.03" thick, and the surrounding shale formation by a sheet of relatively low velocity copper of the same thickness, with the mating edges soldered together. Piezoelectric crystal transducers planted on the model were used as a source and receiver spread, simulating an array of a shot and seismometer spread along the surface of the earth and provision was made for amplifying and recording the receiver outputs. The depth of the reflecting interface was 5". The compressional wave velocity was 15,800 ft./sec. for the copper and 21,800 ft./sec. for the steel, and the angle of critical reflection was 46.5°. This corresponded to a critical distance of 10.5". The range of receiver distances from the sources was from 7.5" to 14", with the receivers located at half-inch intervals along a horizontal line between the source and the fault location. When the reflection point was far removed from the simulated fault, the receiver amplitude rose by a factor of 10 to 1, i.e., the amplitude of the receiver most distant from the source was about 10 times the amplitude of the signal from the receiver closest the energy source. The source-detector array was progressively moved toward the fault location in increments of one-half inches until the reflection point at the horizontal steel-copper reflecting interface passed the fault location. A record was made of the detector outputs for each array location and a plot of the amplitude curves made as shown in FIGURE 1–B. A line 20 drawn through the amplitude maxima was found to approach the fault and clearly indicate its location.

The foregoing description of the present invention has been given for the purpose of exemplification, and from a reading of the same, various alterations and modifications of the invention will become apparent to the artisan. It will be understood that such alterations and modifications fall within the spirit and scope of the invention, the scope being defined by the appended claims.

I claim:

1. A method of seismic prospecting directed toward the location of a suspected fault in a particular underground formation wherein said underground formation and overlying material has a critical distance $d_c$, said method comprising:
    (a) locating a spread of seismic detectors at a first location in alignment with a first point and said suspected fault, at least one of said detectors being located a distance less than $d_c$ from said shot point and at least another of said detectors being located a distance at least as great as $d_c$ from said shot point,
    (b) initiating a seismic wave in the earth at said first point,
    (c) detecting the resulting seismic wave signal arriving at the said seismic detectors, including the event characterized by reflection from from the upper surface of said formation,
    (d) obtaining a value of the magnitude of the maximum amplitude of said reflected event for each detector of said spread,
    (e) moving said spread of detectors in a straight line to a second location in a direction toward said suspected fault,
    (f) initiating a second seismic wave at a second point, the spacing of the detectors at said second location and the point at which the second seismic wave is initiated being the same as that of the first spread of detectors and said first point,
    (g) repeating steps (c) and (d) for the second seismic wave,
    (h) recording the value of the maximum amplitude of said reflected event for each detector for each location of said spread of detectors for each seismic wave initiation.

2. A method as defined in claim 1 in which the step of recording includes plotting the values of the amplitude versus points indicative of seismic detector positions to obtain an amplitude curve for each location.

3. A method as defined in claim 2 including the step of connecting the points of maximum amplitude of each amplitude curve.

4. A method as defined in claim 3 which includes continually moving the location of detectors and said points of a seismic initiation at least until the maximum of said amplitude curve obtained for a new position is sharply reduced from that of the previous location.

5. A method as defined in claim 11 wherein the approximate center of said spread of detectors is located a distance $d_c$ from said shot point.

6. A method of locating a suspected fault in an underground formation wherein said underground formation and overlying material have a critical distance $d_c$, the method which comprises:
   (a) establishing a first fixed array comprising a seismic energy source at a first shot point and a horizontal spread of seismic detectors spaced from said shot point and along a line between said shot point and said suspected fault location, one of said detectors being spaced a distance less than, and another of said detectors being spaced at a distance at least as great as, the critical distance $d_c$ from said shot point;
   (b) initiating a seismic wave in the earth at said shot point;
   (c) detecting the resulting reflected seismic waves arriving at said detectors, such reflected seismic waves including the reflected event from said underground formation;
   (d) obtaining the value of the maximum amplitude of said reflected event for each of the detectors of said array, relocating said first array along said line at intervals progressively closer to the suspected fault location including repeating said initiating step and the corresponding detecting and obtaining steps at each said array location;
   (f) plotting the value of the maximum amplitudes on a map versus points indicative of individual seismic detector positions to obtain an amplitude curve for each location.

7. A method as defined in claim 6 which includes a step of connecting the point of maximum amplitude of the various amplitude curves.

8. A method as defined in claim 7 in which said progressive relocation is continued at least until the maximum amplitude of the amplitude curves decreases substantially.

References Cited

UNITED STATES PATENTS

| | | | |
|---|---|---|---|
| 2,354,548 | 7/1944 | Ricker | 181—0.5 |
| 2,941,184 | 6/1960 | Moody | 181—0.5 X |
| 3,096,846 | 7/1963 | Savit et al. | 181—0.5 |
| 3,105,568 | 10/1963 | Jolly | 181—0.5 |
| 3,185,957 | 5/1965 | Ikard et al. | 181—0.5 X |
| 3,217,828 | 11/1965 | Mendenhall et al. | 181—0.5 |
| 2,449,921 | 9/1948 | Wolf | 181—0.5 |

RODNEY D. BENNETT, *Primary Examiner.*

BENJAMIN A. BORCHELT, *Examiner.*

M. F. HUBLER, *Assistant Examiner*

UNITED STATES PATENT OFFICE
CERTIFICATE OF CORRECTION

Patent No. 3,354,985                          November 28, 1967

Neil R. Sparks

It is hereby certified that error appears in the above numbered patent requiring correction and that the said Letters Patent should read as corrected below.

Column 5, line 12, for "spot" read -- plot --; column 6, line 50, strike out "from", second occurrence; column 7, line 6, for the claim reference numeral "11" read -- 1 --.

Signed and sealed this 25th day of February 1969.

(SEAL)
Attest:

Edward M. Fletcher, Jr.                      EDWARD J. BRENNER
Attesting Officer                            Commissioner of Patents